(12) United States Patent
Blokland et al.

(10) Patent No.: US 9,353,796 B2
(45) Date of Patent: May 31, 2016

(54) SENSOR-BEARING UNIT AND APPARATUS COMPRISING SUCH AN UNIT

(75) Inventors: Susanne Blokland, Ann Arbor, MI (US); Pierrick Maze, Tours (FR); Vincent Sausset, Azay le Rideau (FR)

(73) Assignee: AKTIEBOLAGET SKF, Gothenberg (SE)

( * ) Notice: Subject to any disclaimer, the term of this patent is extended or adjusted under 35 U.S.C. 154(b) by 0 days.

(21) Appl. No.: 14/403,286

(22) PCT Filed: May 22, 2012

(86) PCT No.: PCT/IB2012/001316
§ 371 (c)(1),
(2), (4) Date: Feb. 10, 2015

(87) PCT Pub. No.: WO2013/175257
PCT Pub. Date: Nov. 28, 2013

(65) Prior Publication Data
US 2015/0159698 A1    Jun. 11, 2015

(51) Int. Cl.
| | |
|---|---|
| *F16C 32/00* | (2006.01) |
| *F16C 41/00* | (2006.01) |
| *G01P 3/44* | (2006.01) |
| *F16C 33/66* | (2006.01) |
| *F16C 35/04* | (2006.01) |
| *G01D 11/02* | (2006.01) |
| *F16C 19/06* | (2006.01) |

(52) U.S. Cl.
CPC ............... *F16C 41/00* (2013.01); *F16C 33/66* (2013.01); *F16C 33/6666* (2013.01); *F16C 33/6685* (2013.01); *F16C 35/042* (2013.01); *F16C 41/007* (2013.01); *G01D 11/02* (2013.01); *G01P 3/443* (2013.01); *F16C 19/06* (2013.01)

(58) Field of Classification Search
CPC .. F16C 33/6659; F16C 33/6685; F16C 41/00; F16C 41/007; F16C 33/6666; F16C 19/00; F16C 35/042; G01D 11/02; G01P 3/443
USPC .......... 384/446, 448, 473, 474; 324/173, 174, 324/207.22, 207.25
See application file for complete search history.

(56) References Cited

U.S. PATENT DOCUMENTS 5,492,416 A * 2/1996 Gabelli ................ F16C 23/086
                                                           277/559
5,570,013 A   10/1996 Polinsky et al.
(Continued)

FOREIGN PATENT DOCUMENTS

| EP | 1447579 A1 | 8/2004 |
| EP | 1557676 A1 | 7/2005 |
| EP | 1574823 A1 | 9/2005 |

*Primary Examiner* — Adam D Rogers
(74) *Attorney, Agent, or Firm* — Bryan Peckjian; SKF USA Inc. Patent Dept.

(57) ABSTRACT

A sensor-bearing unit, adapted for implementation in an oil lubricated environment and comprising: a bearing including at least one rotating ring movable in rotation around a central axis, and a detection device for tracking the rotation of the rotating ring. The detection device is locked to the bearing and includes at least one target and at least one sensor associated with the target. At least one axial side of the bearing includes a passage opened along an axial direction parallel to the central axis and allowing an oil flow through the bearing. The detection device includes an air gap defined radially to the central axis between a maximum outer radius of the target and a minimum inner radius of the sensor.

13 Claims, 6 Drawing Sheets

(56) References Cited

U.S. PATENT DOCUMENTS

| | | |
|---|---|---|
| 6,655,844 B1 | 12/2003 | Message |
| 6,882,142 B2 * | 4/2005 | Koike .................... G01D 5/145 |
| | | 324/174 |
| 6,956,367 B2 * | 10/2005 | Fujikawa ............... G01D 5/145 |
| | | 324/165 |
| 7,290,938 B2 * | 11/2007 | Aoki ....................... F16C 19/06 |
| | | 384/448 |
| 8,136,994 B2 * | 3/2012 | Masuda .................. G01P 1/026 |
| | | 384/448 |
| 8,188,729 B2 * | 5/2012 | Ito ........................... F16C 33/80 |
| | | 324/173 |
| 8,212,551 B2 * | 7/2012 | Yamada .................. F16C 19/52 |
| | | 324/207.22 |
| 8,258,659 B2 * | 9/2012 | Debrailly .............. F16C 35/067 |
| | | 310/68 B |
| 2008/0152272 A1 * | 6/2008 | Debrailly ................ F16C 19/54 |
| | | 384/448 |

* cited by examiner

SENSOR-BEARING UNIT AND APPARATUS COMPRISING SUCH AN UNIT

CROSS REFERENCE TO RELATED APPLICATIONS

This is a National Stage Application claiming the benefit of International Application Number PCT/IB2012/001316 filed on 22 May 2013 (22.05.2012), which is incorporated herein by reference in its entirety.

TECHNICAL FIELD OF THE INVENTION

The invention concerns a sensor-bearing unit comprising a bearing and a detection device for tracking rotation of the bearing. The invention also concerns an apparatus comprising an oil flow and such a sensor-bearing unit.

BACKGROUND OF THE INVENTION

Today, known sensor-bearing units are not fully adapted to be implemented in oil lubricated environments, such an apparatus of the electric motor type.

The same or a different lubricant can be used for the bearing and the apparatus. The bearing can be provided with sealing members on its axial sides to avoid oil leak out of the bearing or entry into the bearing. As an alternative, the bearing can be fully open to allow oil flow between its rotating and non-rotating rings.

The detection device usually comprises a sensor fixed to the non-rotating ring and a target fixed to the rotating ring of the bearing. The detection device can also be provided with sealing members or a labyrinth to avoid or reduce oil entry between the sensor and the target. Indeed, efficiency of known detection device may be reduced in operation due to the oil contamination. However, these devices have a complex structure.

EP-A-1 557 676 describes a sensor-bearing unit, which is not adapted for a proper oil flow. According to a first embodiment, this unit comprises a target fixed to the inner ring and a sensor fixed to the outer ring of the bearing. The sensor comprises a sensor cover forming a retainer, where oil can stagnate and particles can settle, so that the sensor operation can be disturbed. Moreover, the sensor cover extends towards central axis beyond the target and forms a shield opposed to oil flow through the unit. In other words, this unit is not adapted for implementation in oil lubricated environments.

SUMMARY OF THE INVENTION

The aim of the invention is to provide an improved sensor-bearing unit, adapted to be implemented in oil lubricated environments.

To this end, the invention concerns a sensor-bearing unit, adapted for implementation in an oil lubricated environment and comprising: a bearing including at least one rotating ring movable in rotation around a central axis, and a detection device for tracking the rotation of the rotating ring, the detection device being locked to the bearing and including at least one target and at least one sensor associated with the target, wherein at least one axial side of the bearing includes a passage opened along an axial direction parallel to the central axis and allowing an oil flow through the bearing, and wherein the detection device includes an air gap defined radially to the central axis between a maximum outer radius of the target and a minimum inner radius of the sensor.

Thanks to the invention, the oil flow can pass through the bearing without having to follow a complex path, including for example any retainer and/or shield. With the detection device fixed to the bearing, the unit forms a compact and practical assembly. The dimensions of the target and sensor are as close as possible to those of the inner ring and outer ring. The air gap between the target and the sensor can be optimised, particularly to allow a proper oil flow through the detection device. The oil flow in the environment of the unit is not disturbed by its presence. The unit materials are chosen resistant against oil aggression.

According to further aspects of the invention which are advantageous but not compulsory, such a sensor-bearing unit may incorporate one or several of the following features:
  Both axial sides of the bearing includes a passage opened along an axial direction parallel to the central axis and allowing an oil flow through the bearing between both axial sides.
  Only one axial side of the bearing includes a passage opened along an axial direction parallel to the central axis and allowing an oil flow through the bearing.
  The passage comprises a first portion for oil entry inside the bearing and a second portion for oil outflow outside the bearing.
  The axial side of the bearing axially opposed to the passage comprises a sealing member.
  The minimum inner radius of the sensor extending towards the central axis is greater than the maximum target diameter of the target around the central axis.
  The detection device includes guiding means for guiding an oil flow along a strictly axial direction between the target and the sensor through the detection device.
  The target and the sensor form a detection device with radial reading.
  The sensor includes an electronic card and at least one detection cell which is associated with the target and connected to the electronic card.
  The maximum outer radius of the target defined radially to the central axis is comprised between 95% and 105% of a radius of the rotating ring of the bearing.
  The bearing is a rolling bearing comprising rolling elements located between the rotating ring and the non-rotating ring.

The invention also concerns an apparatus comprising an oil flow and at least one sensor-bearing unit as mentioned hereabove.

According to further aspects of the invention which are advantageous but not compulsory, such an apparatus may incorporate one or several of the following features:
  The apparatus includes a rotating shaft and a housing and the at least one sensor-bearing unit has a rotative inner ring mounted on the shaft and a non-rotative outer ring mounted in the housing.
  The apparatus is an electric motor comprising a rotor locked in rotation with the shaft and a stator fixed to the housing.
  The apparatus includes an inner chamber at least partially filled with an oil bath.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
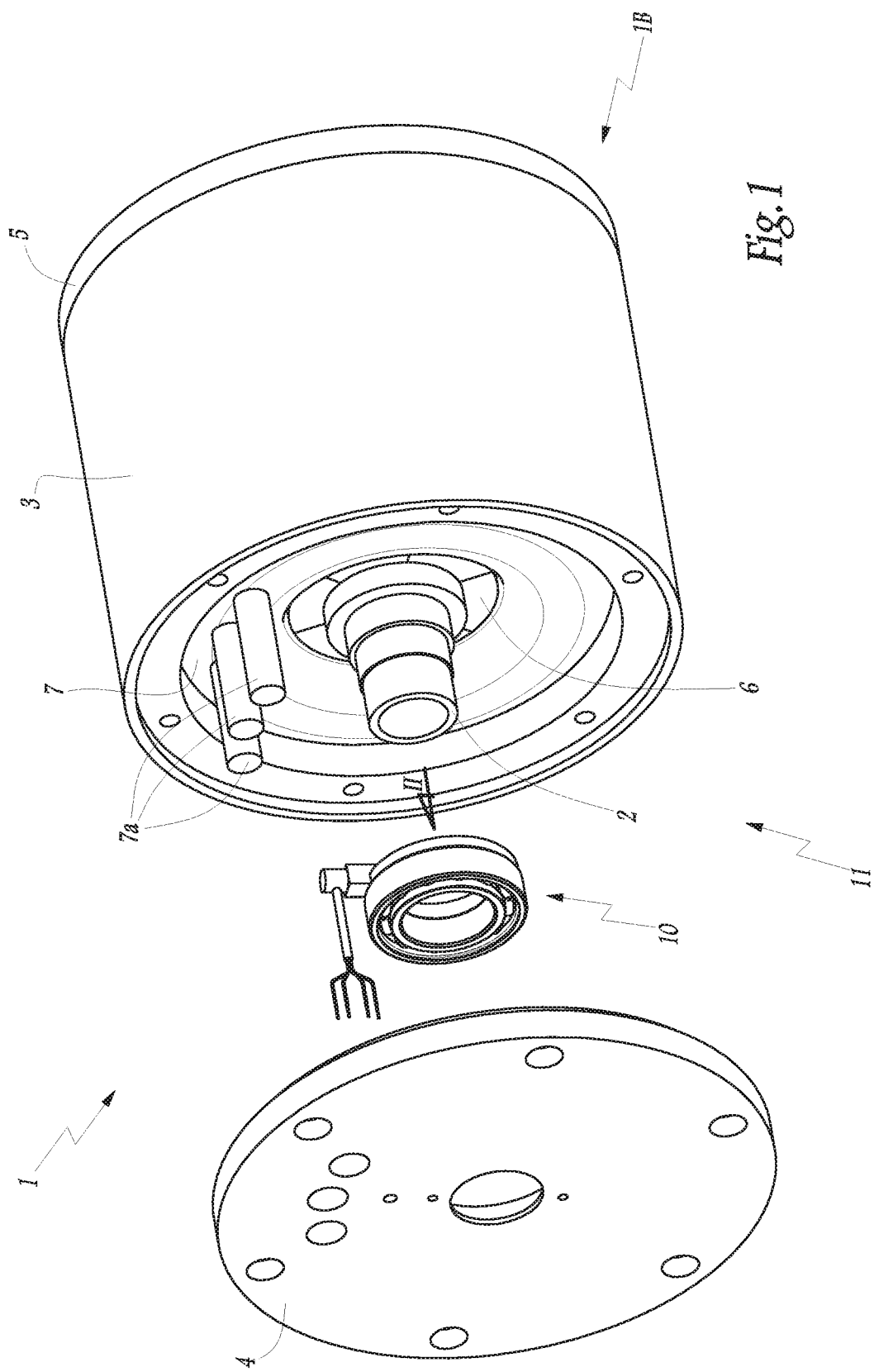
FIG. 1 is an exploded perspective view of an apparatus according to the invention, of the electric motor type, comprising a sensor-bearing unit according to the invention.
Figure 2:
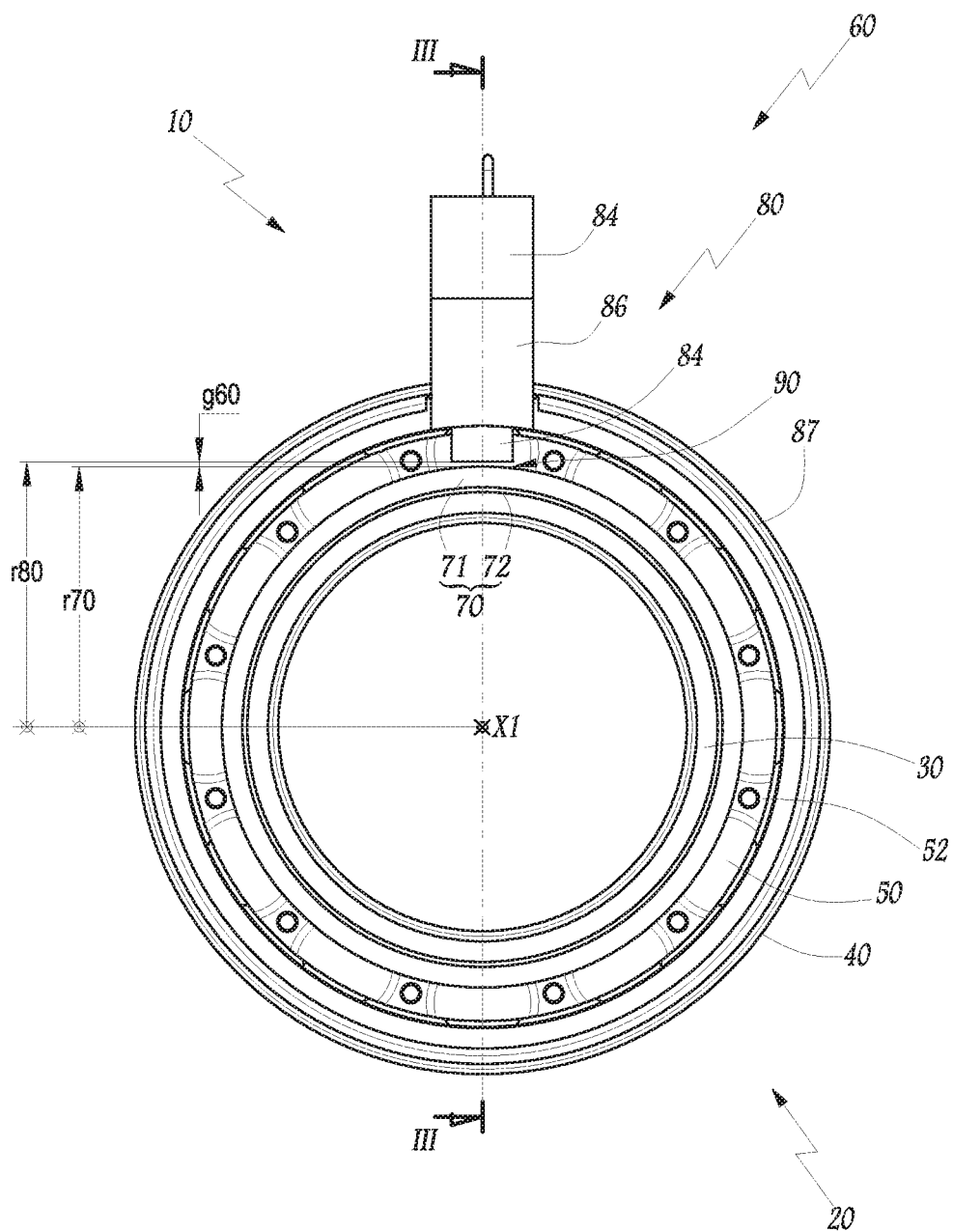
FIG. 2 is a side view of the sensor-bearing unit along arrow II of FIG. 1.
Figure 3:
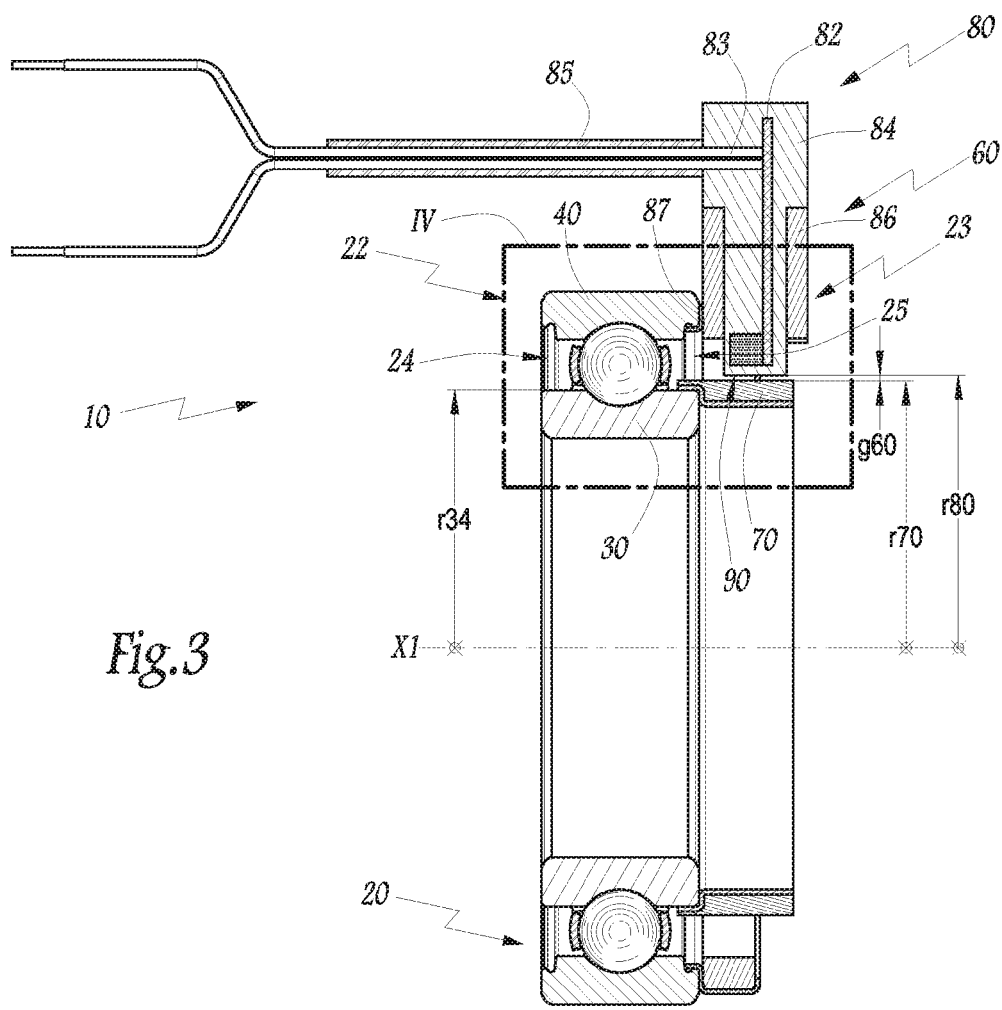
FIG. 3 is a sectional view along line of FIG. 2.
Figure 4:
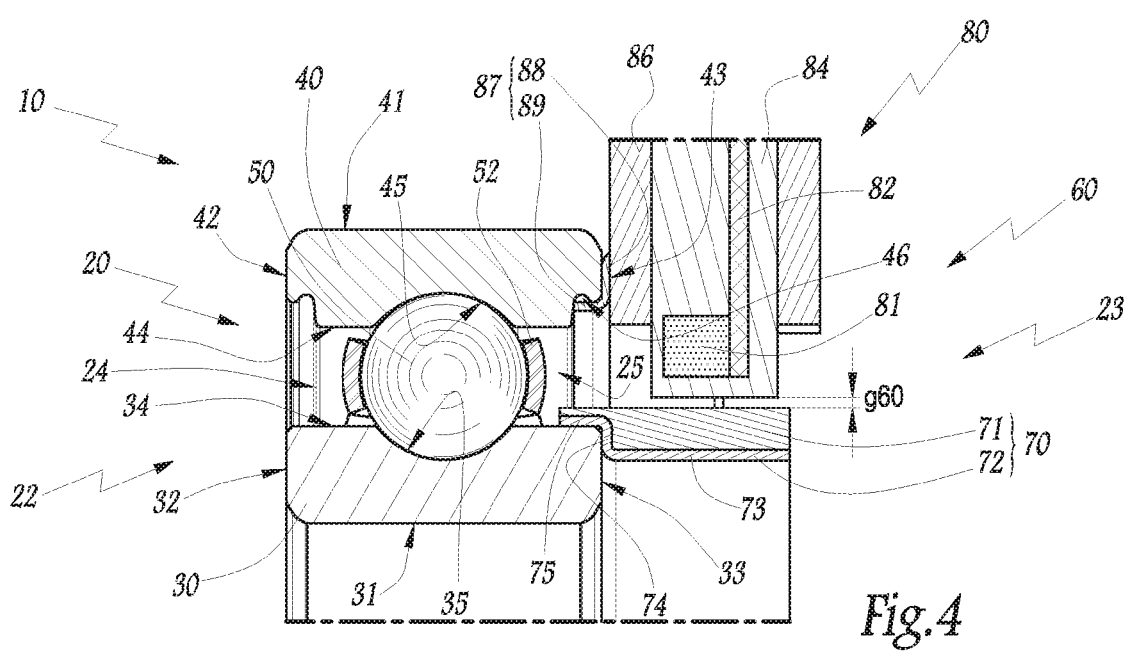
FIG. 4 is a view at a larger scale of detail IV from FIG. 5.
Figure 5:
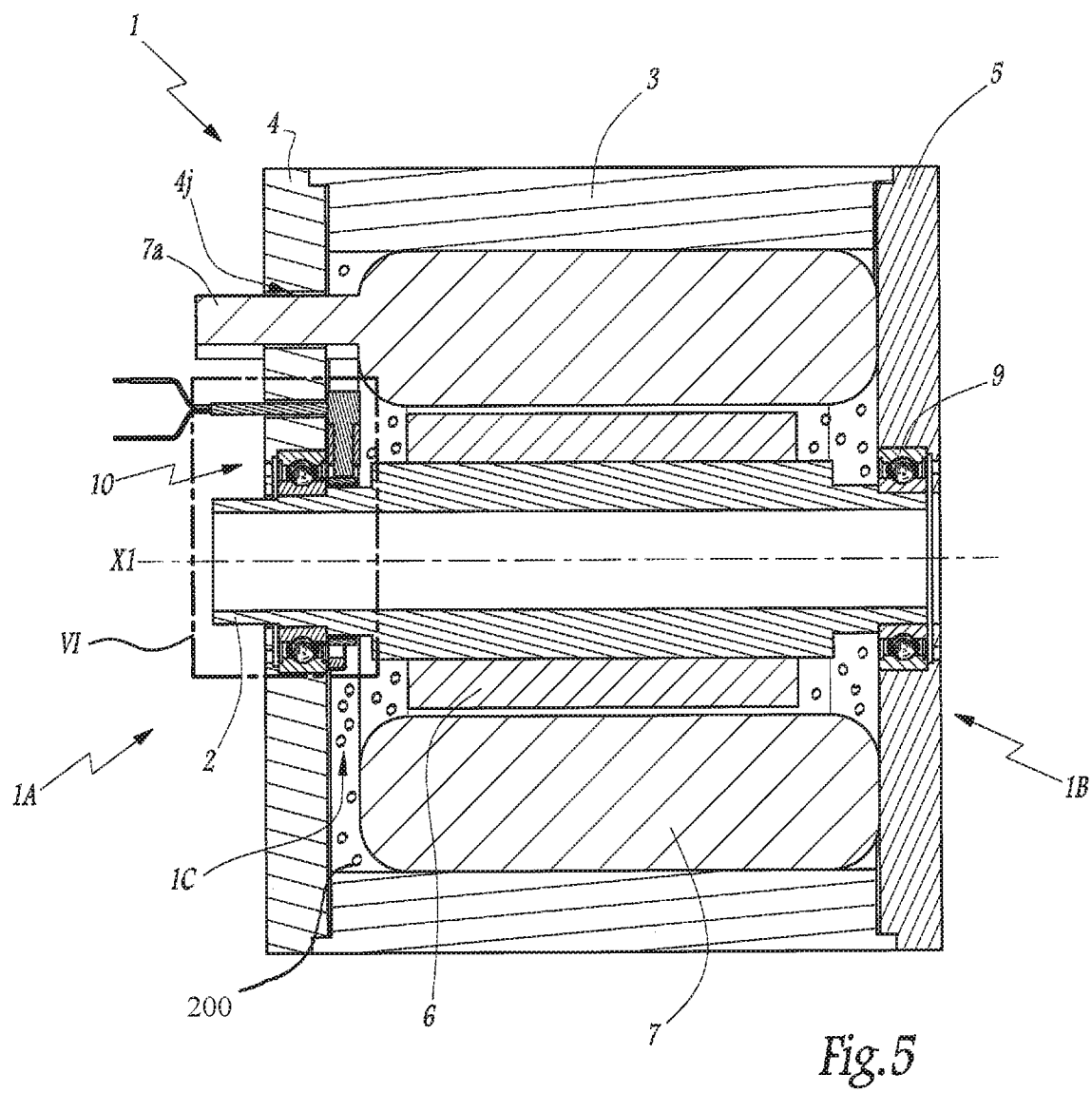
FIG. 5 is a sectional view, in the same plane as FIG. 3, of the apparatus of FIG. 1 in an assembly configuration.

The apparatus 1 according to the invention represented on FIGS. 1 to 6 is an electric motor for driving a gearbox, not shown.

The apparatus 1 comprises a shaft 2, a main housing 3, covers 4 and 5, a rotor 6, a stator 7, a bearing 8 and a sensor-bearing unit 10 according to the invention. The sensor-bearing unit 10 comprises a bearing 20 and a detection device 60. The bearings 8 and 20 are mounted on the shaft 2, so that these elements 2, 8 and 20 are centered on a central axis X1. On figures and in the description hereafter are defined a left side 1A and a right side 1B of the apparatus 1. Bearings 20 and 8 are positioned respectively in the covers 4 and 5, which are positioned respectively on sides 1A and 1B of the main housing 3.

Figure 6:
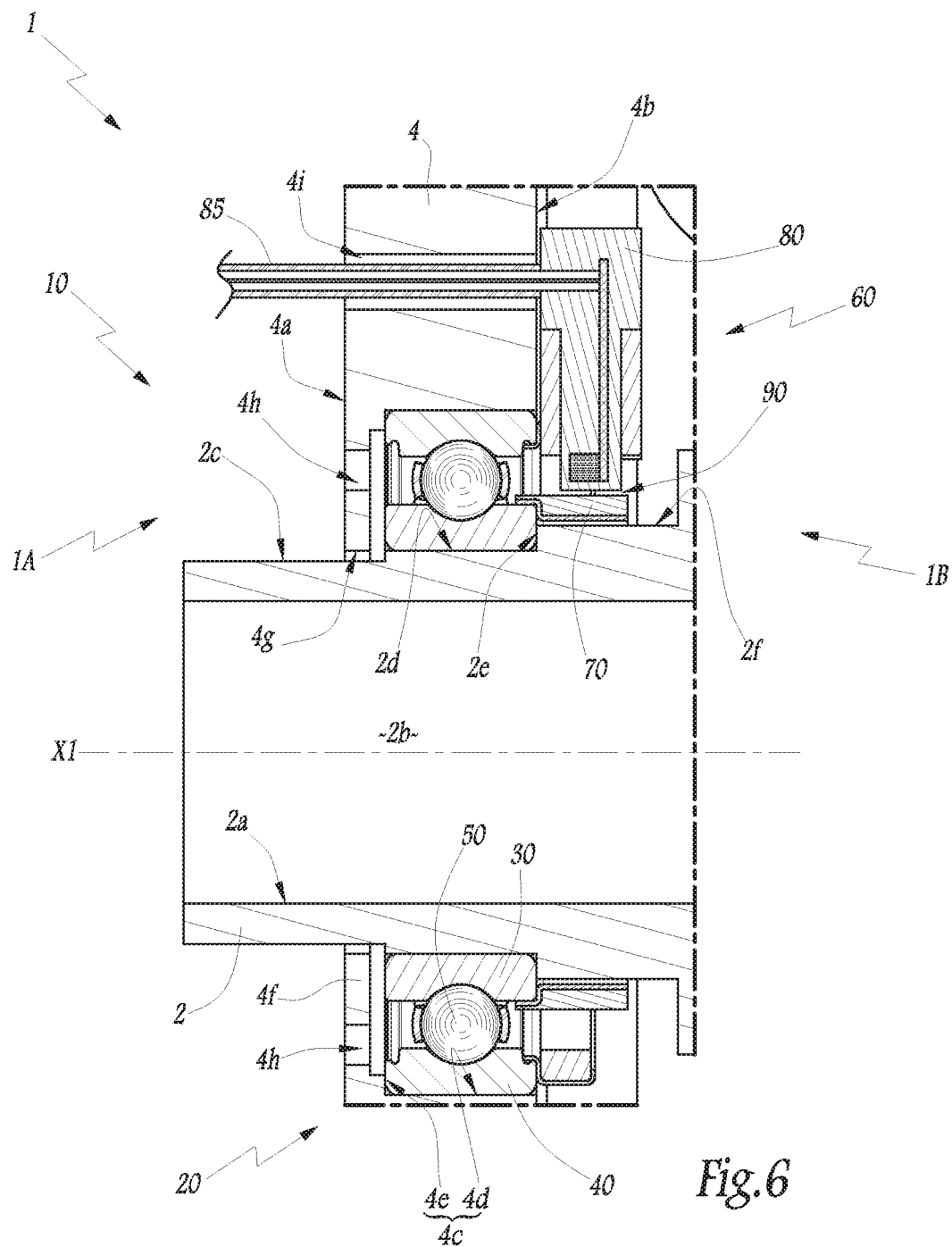
FIG. 6 is a view at a larger scale of detail VI from FIG. 5.

As shown on FIG. 6, when covers 4 and 5 are positioned on both sides 1A and 1B of the main housing 3, an inner chamber 1C is defined inside the apparatus 1, more precisely inside housing 3-5. The chamber 1C defines an oil lubricated environment, for example by oil injection from the outside of the apparatus 1 or by providing an oil bath (shown by oil particles 200 in Fig. 5) in the chamber 1C.

The shaft 2 extends between both sides 1A and 1B through the housing 3-5 and the chamber 1C, along axis X1. The shaft 2 is hollow, with a cylindrical inner bore 2a defining an axial cavity 2b in which another shaft or other elements not shown can be positioned. The shaft 2 is symmetrical about a median plane perpendicular to the central axis X1. On the left side 1A, the shaft 2 comprises cylindrical outer surfaces 2c, 2d and 2f of increasing diameters from the left 1A to the right 1B. A shoulder 2e extends radially relative to axis X1 between surfaces 2d and 2f.

The cover 4 has a left face 4a oriented outside housing 3-5 and a right face 4b oriented towards housing 3-5. The cover 4 comprises a bearing housing 4c including a cylindrical inner bore 4d and a radial shoulder 4e. The cover 4 has an outer wall 4f extending radially towards axis X1 on the left side of the bearing housing 4c. The cover 4 has two holes 4h delimited through wall 4f parallel to axis X1 and an inner bore 4g of the wall 4f radially spaced from shaft 2. The cover 4 has a passage 4i delimited through wall 4f parallel to axis X1 for data transmission cables 85 extending from unit 20 to outside the apparatus 1 and passages 4j delimited through cover 4 for power cables 7a extending from the stator 7 to outside the apparatus 1.

The rotor 6 is locked in rotation on surface 2f of shaft 2, whereas the stator 7 is mounted stationary relative to main housing 3 in chamber 1C. Power cables 7a extends from the stator 7 through passages 4j provided in cover 4.

The bearing 20 comprises a rotating inner ring 30, a non rotating outer ring 40 and rolling elements 50 located between inner ring 30 and outer ring 40. The bearing 20 has a left side 22 and a right side 23, respectively oriented on left side 1A and right side 1B of the apparatus 1. The inner ring 30 has a cylindrical inner bore 31, a left face 32, a right face 33 and a cylindrical outer surface 34 including a concave raceway 35. The outer ring 40 has a cylindrical outer surface 41, a left face 42, a right face 43 and a cylindrical inner bore 44 including a concave raceway 45. The rolling elements 50 are positioned in a bearing cage 52 and are mobile on the raceways 35 and 45. The outer bore 34 has a maximum outer radius r34.

The inner ring 30 is locked in rotation with shaft 2, more precisely with its inner bore 31 fitted on surface 2d and its right face 33 bearing against shoulder 2e. The outer ring 40 is locked in the bearing housing 4c, more precisely with its outer surface 41 fitted in bore 4d and its left face 42 bearing against shoulder 4e.

The bearing 20 includes a left passage 24 and a right passage 25, delimited between inner bearing 30 and outer bearing 40 respectively on the left side 22 and the right side 23. The passages 24 and 25 are opened in bearing 20 along an axial direction parallel to the central axis X1. Each passage 24 and 25 allows an oil flow through bearing 20.

The detection device 60 comprises a target 70 and a sensor 80 of the magnetic type. The detection device 60 is locked to the bearing 20 on its right side 23, with the target 70 locked to the inner ring 30 and the sensor 80 locked to the outer ring 40. The target 70 extends all around axis X1, while the sensor 80 is positioned radially to axis X1 in the upper part of the chamber 1C. The target 70 and the sensor 80 form a detection device 60 with radial reading. The detection device 60 can be used for tracking the rotation of the rotating inner ring 30 relative to the stationary outer ring 40 or other stationary parts.

The target 70 comprises a multi-polar magnet 71 and a magnet holder 72. The magnet holder 72 comprises an inner axial part 73, a radial part 74 and an outer axial part 75. The magnet 71 is fixed to parts 73 and 74 of the magnet holder 72, which is fixed to the inner ring 30. More precisely, part 74 bears against right face 33 while part 75 is fitted to outer surface 34. The magnet holder 72 may be fixed to the inner ring 30 by any convenient means, for example crimping or bonding.

The sensor 80 comprises a detection cell 81, an electronic card 82, connection wires 83, a sensor housing 84, a sheath 85 for wires 83, a sensor holder 86 and a bracket 87. The housing 84 is preferably in resin or plastic, while the holder 86 is preferably in plastic or metal. If needed, the sensor housing 84 may be removed from sensor holder 86. The holder 86 is fixed to the bracket 87, comprising a radial part 88 and an axial part 89. The sensor 80 is fixed to the outer ring 40 via the bracket 87. More precisely, part 88 bears against right face 43 while part 89 is fitted in a groove 46 delimited between face 43 and inner bore 44 of the outer ring 40.

The detection device 60 includes an air gap 90 delimited between the target 70 and the sensor 80. The gap 90 is delimited radially to axis X1 between a maximal outer radius r70 of the target 70 and a minimal inner radius r80 of the sensor 80. On the example of FIGS. 1 to 6, the radius r70 is slightly greater than radius r34 of the inner ring 30. The gap 90 has a pitch g60, which is a functional dimension of the detection device 60. The gap 90 is the only passage defined between the target 70 and the sensor 80 inside the detection device 60, radially to axis X1 and axially along an axial direction parallel to axis X1. The gap 90 allows an oil flow through the bearing 20 from its right side 23 where the detection device 60 is located.

Moreover, the sensor 80 extends radially towards the central axis X1 on the minimum inner radius r80 which is greater than the maximum target diameter r70 of the target 70. The sensor 80 does not form a shield which would stop the old flow through the detection device 60 and the bearing 20. Preferably, the maximum outer radius r70 of the target 70, defined on the magnet 71, is comprised between 95% and 105% of the outer maximum radius r34 of the rotating ring 30. Thus, oil can flow freely between magnet 71, sensor housing 84 and sensor cover 86, through the air gap 90.

In other words, the detection device 60 includes guiding means 71, 84, 86 and 90 for guiding oil flow along a strictly axial direction between the target 70 and the sensor 80 through the detection device 60.

According to the invention, the sensor-bearing unit 10 is adapted for implementation in an oil lubricated environment. Different flow oil modes may be implemented in connection with the apparatus 1 or other apparatus equipped with unit 10. The oil flow may come from outside or inside the apparatus 1, for example from an oil bath. The oil flow may be intended to lubricate the bearing 20 and/or other parts of the apparatus 1. Thanks to respective configurations of the open passages 24 and 25, the detection device 60 and the gap 90, the oil can flow simply through the unit 10.

Other non-show embodiments of the apparatus 1 and/or of the sensor-bearing unit 10 can be implemented without leaving the scope of the invention.

According to a non-shown embodiment, the apparatus 1 can be another mechanical or electro-mechanical system which is not of the electric motor type.

According to another non-shown embodiment, the bearing 20 can comprise a rotative outer ring 40 and a non-rotative inner ring 40. In this case, the target 70 is preferably fixed to the rotative outer ring 40.

According to another non-shown embodiment, the maximum outer radius r70 of the target 70 is equal to the outer radius r34 of the inner ring 30. For example, the outer bore 34 of the inner ring 30 can include an annular groove for mounting the magnet holder 72. According to another example, the inner bore 31 of the inner ring 30 can include an annular groove for mounting the magnet holder 72.

Figure 7:
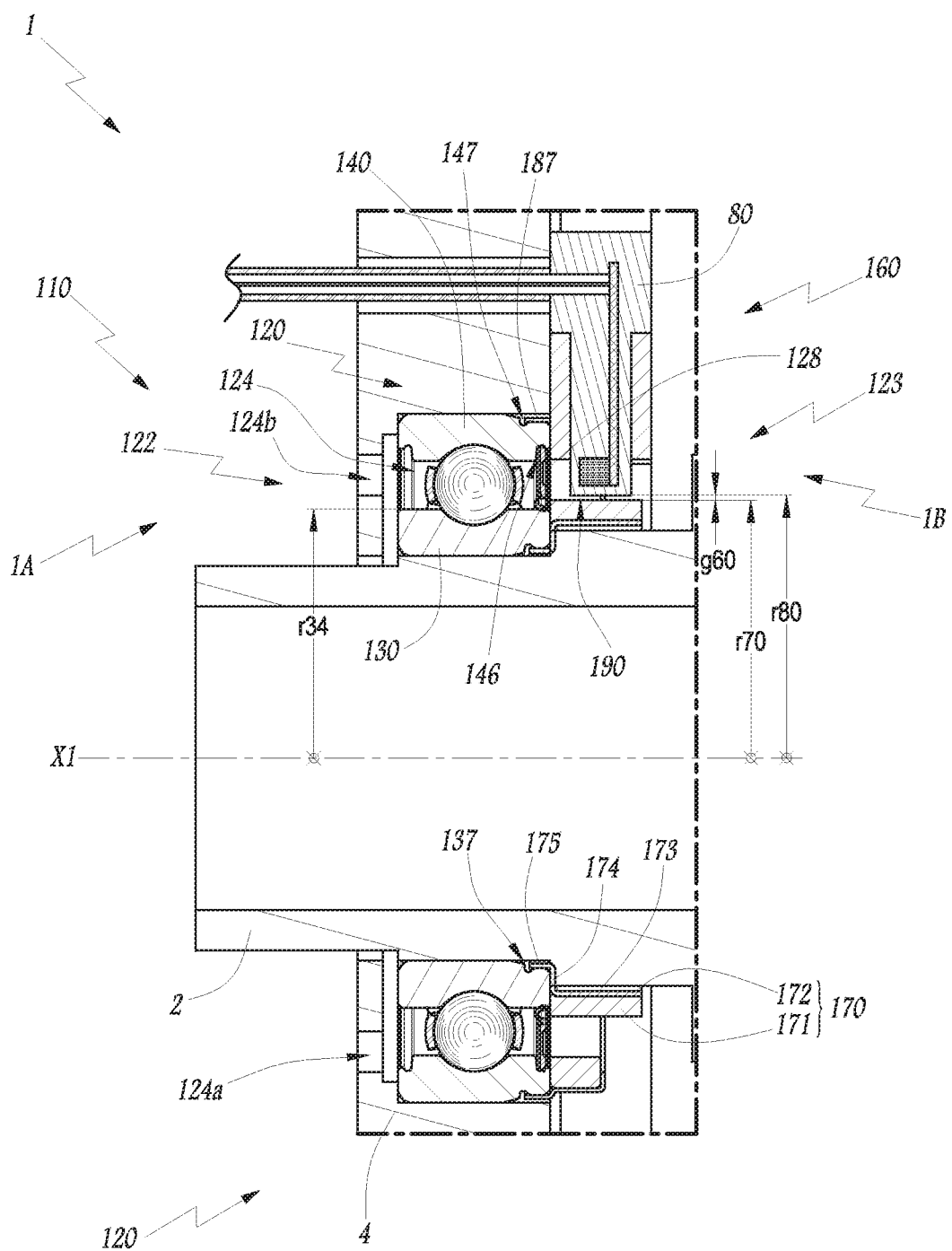
FIG. 7 is a sectional view similar to FIG. 6 of the apparatus comprising a sensor-bearing unit according to a second embodiment of the invention.

A second embodiment of the invention is represented on figure 7.

This second embodiment concerns a sensor-bearing unit 110 comprising a bearing 120 and a detection device 160. Elements similar to the first embodiment have the same references augmented by 100 and work in a similar way.

The bearing 120 has a left side 122 and a right side 123. The bearing 120 comprises a rotative inner ring 130 and a non-rotative outer ring 140. The bearing 120 also comprises a sealing member 128 positioned in an annular groove 146 of the outer ring 140, on the right side 123. The sealing member 128 is stationary with the outer ring 140 and has a sealing lips positioned against the rotative inner ring 130. In other words, only the axial side 122 of the bearing 120 includes a passage 124 opened along an axial direction parallel to the central axis X1 and allowing an oil flow through the bearing 120.

Depending on the oil flow through the bearing 120, the passage 124 can comprise a first portion 124a for oil entry inside the bearing 120 and a second portion 124b for oil outflow outside the bearing 120. As an alternative to the configuration of FIG. 7, the portion 124a and 124b can be reversed relative to axis X1.

The detection device 160 comprises a target 170 and a sensor 180. The target 170 comprises a magnet 171 and a magnet holder 172. The magnet holder 172 comprises an outer axial part 173, a radial part 174 and an inner axial part 175. The part 174 bears against right face of the ring 130, while part 175 is fitted in an annular groove 137 delimited between right face and inner bore of the inner ring 130. The sensor 180 comprises a bracket 187, which is fitted in an annular groove 147 delimited between right face and outer bore of the outer ring 140.

A gap 190 is delimited between the target 170 and the sensor 180. The detection device 160 includes guiding means 171, 84, 86 and 190 for guiding the oil flow along a strictly axial direction between the target 170 and the sensor 180 through the detection device 160.

In addition, technical features of the different embodiments can be, in whole or part, combined with each other. Thus, the apparatus 1 and the sensor-bearing unit 10 can be adapted to any specific requirements of the application.

The invention claimed is:

1. An apparatus comprising a sensor-bearing unit adapted for implementation in an oil lubricated environment, comprising:

an apparatus housing defining a recess therein with a recess sidewall;

the sensor-bearing unit, comprising a bearing having an inner ring and an outer ring positioned about a central axis and a plurality of rolling elements therebetween, the outer ring having an axially extending outer surface, the bearing is positioned within the recess of the apparatus housing such that the recess sidewall entirely covers and abuts the axially extending outer surface of the outer ring;

a bracket positioned along and contacting a radially extending axial side of the outer ring;

a sensor holder attached to a side of the bracket opposite from the radially extending axial side of the outer ring, the sensor holder not contacting the outer ring;

a sensor housing secured to the sensor holder and not contacting the outer ring, the sensor housing extending radially inwardly past the outer ring;

a detection cell disposed in and enclosed by the sensor housing;

a magnet secured to the inner ring;

wherein an axial side of the bearing adjacent the sensor housing comprises a passage opened along an axial direction parallel to the central axis and allowing an oil flow through the bearing, the passage including an air gap defined radially to the central axis between a maximum outer radius of the magnet and a minimum inner radius of the sensor housing.

2. The sensor-bearing unit according to claim 1, wherein an opposite axial side of the bearing includes a second passage opened along the axial direction parallel to the central axis and allowing a second oil flow through the bearing.

3. The sensor-bearing unit according to claim 1, wherein the passage comprises a first portion for oil entry inside the bearing and a second portion for oil outflow outside the bearing.

4. The sensor-bearing unit according to claim 1, wherein a sealing member is located on the axial side of the bearing between the plurality of rolling elements and the passage.

5. The sensor-bearing unit according to claim 1, wherein the minimum inner radius of the sensor housing extending towards the central axis is greater than the maximum outer radius of the magnet around the central axis.

6. The sensor-bearing unit according to claim 1, wherein the magnet and a sensor form a detection device and the magnet guides the oil flow along the axial direction between the magnet and the sensor housing.

7. The sensor-bearing unit according to claim 1, wherein the magnet and a sensor form a detection device with radial reading.

8. The sensor-bearing unit according to claim 1, further comprising a sensor including an electronic card and the detection cell connected to the electronic card.

9. The sensor-bearing unit according to claim 1, wherein the maximum outer radius of the magnet defined radially to the central axis is comprised between 95 % and 105 % of a maximum radius of the inner ring of the bearing.

10. The apparatus according to claim 1, wherein the apparatus includes a rotating shaft and wherein the inner ring of the sensor-bearing unit is mounted on the shaft and the outer ring is mounted in the apparatus housing.

11. The apparatus according to claim 1, wherein the apparatus is an electric motor comprising a rotor locked in rotation with a shaft and a stator fixed to the apparatus housing.

12. The apparatus according to claim 1, wherein the apparatus includes an inner chamber at least partially filled with an oil bath.

13. The apparatus according to claim 1, wherein the passage is free of any shield or seal between the air gap and at least one of the plurality of rolling elements and a cage configured to circumferentially space the plurality of rolling elements such that a particle traveling in the axial direction from the air gap towards the plurality of rolling elements will not contact any element before reaching the at least one of the plurality of rolling elements and the cage.

* * * * *